(12) United States Patent
Ueoka et al.

(10) Patent No.: US 9,335,618 B2
(45) Date of Patent: May 10, 2016

(54) PROJECTION IMAGE DISPLAY APPARATUS

(75) Inventors: Kazumasa Ueoka, Ibaraki (JP); Shinro Inui, Ibaraki (JP); Kei Adachi, Ibaraki (JP); Chohei Ono, Ibaraki (JP); Takafumi Ishizu, Ibaraki (JP); Kazuo Shikita, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 170 days.

(21) Appl. No.: 14/356,451

(22) PCT Filed: Nov. 7, 2011

(86) PCT No.: PCT/JP2011/006179
§ 371 (c)(1),
(2), (4) Date: May 28, 2014

(87) PCT Pub. No.: WO2013/069040
PCT Pub. Date: May 16, 2013

(65) Prior Publication Data
US 2014/0293238 A1    Oct. 2, 2014

(51) Int. Cl.
*G03B 21/14*    (2006.01)
*G03B 21/20*    (2006.01)

(52) U.S. Cl.
CPC ............ *G03B 21/208* (2013.01); *G03B 21/145* (2013.01)

(58) Field of Classification Search
CPC ........ G03B 21/14; G03B 21/20; G03B 21/00; H04N 5/74
See application file for complete search history.

(56) References Cited

U.S. PATENT DOCUMENTS

| 2002/0126379 | A1 | 9/2002 | Fujimori et al. |
| 2005/0001998 | A1 | 1/2005 | Tsubata et al. |
| 2006/0050248 | A1 | 3/2006 | Koga et al. |
| 2010/0214538 | A1* | 8/2010 | Fukunaga ............ G03B 21/208 353/38 |

FOREIGN PATENT DOCUMENTS

| CN | 1723415 A | 1/2006 |
| JP | 2-96703 A | 4/1990 |
| JP | 2002-62587 A1 | 2/2002 |
| JP | 2005-24807 A1 | 1/2005 |
| JP | 2005-352349 A | 12/2005 |
| JP | 2007-25405 A | 2/2007 |

(Continued)

*Primary Examiner* — Sultan Chowdhury
*Assistant Examiner* — Danell L Owens
(74) *Attorney, Agent, or Firm* — Baker Botts L.L.P.

(57) ABSTRACT

A projection image display apparatus capable of maintaining the positional accuracy of an integrator optical system even when subjected to an external force is provided. The projection image display apparatus includes an integrator optical system which converges and uniformizes a light emitted from a light source, a color separating optical system which separates the colors of the light emitted from the integrator optical system, a color synthesizing optical system which synthesizes lights separated by the color separating optical system, a projection optical system which emits the light, which has been synthesized by the color synthesizing optical system, onto a projection surface, a first optical case which fixes and houses the integrator optical system, the color separating optical system, and the color synthesizing optical system at respective predetermined positions, and a second optical case which fixes and houses optical components of the integrator optical system at predetermined positions, and the second optical case is attached to the first optical case.

3 Claims, 5 Drawing Sheets

(56) References Cited

FOREIGN PATENT DOCUMENTS

| JP | 2007-47337 A | 2/2007 |
| JP | 2007-78730 A | 3/2007 |
| JP | 20091048100 A1 | 4/2009 |
| JP | 2010-8767 A | 1/2010 |
| JP | 2010-217651 A | 9/2010 |
| WO | 2009/048100 A1 | 4/2009 |

\* cited by examiner

PROJECTION IMAGE DISPLAY APPARATUS

TECHNICAL FIELD

The present invention relates to a projection image display apparatus.

BACKGROUND ART

In a projection image display apparatus such as a liquid crystal projector, a display element such as a liquid crystal panel is irradiated with light emitted from a light source such as a mercury lamp, and an image formed on the display element is enlarged and projected onto a screen through a projection lens. A configuration of an optical system in the apparatus includes an integrator optical system which converges and uniformizes a light flux emitted from a light source, a color separating optical system which performs color separation, an optical modulation device which performs optical modulation in accordance with image information, a color synthesizing optical system which synthesizes the optically modulated lights, a projection optical system which enlarges and projects the synthesized light onto a projection surface of a screen or the like, an optical case which holds and fixes the various optical systems, and a housing which fixes and houses the optical case.

Here, a technique for housing each of optical components constituting the integrator optical system, the color separating optical system, and others in the optical case is disclosed (see Patent Document 1).

PRIOR ART DOCUMENTS

Patent Documents

Japanese Patent Application Laid-Open Publication No. 2005-24807

SUMMARY OF THE INVENTION

Problems to be Solved by the Invention

According to Patent Document 1, each of the optical components constituting the integrator optical system, the color separating optical system, and others is positioned and fixed to a groove formed in the optical case. The optical case has a complicated internal structure which is matched with the shapes of respective optical components to be housed, and is generally manufactured by, for example, injection molding using a synthetic resin material. Therefore, since the optical case itself is more limited in strength and is more easily deformed than a metal material and the optical case is fixed to a housing of an apparatus, when the housing is deformed by being subjected to an external force, the optical case is also deformed. Consequently, a positional relationship between the optical components housed in the optical case is distorted, which leads to the deterioration in quality of an image to be displayed on a screen (occurrence of raster distortion and luminance decrease).

Therefore, an object of the present invention is to provide a projection image display apparatus capable of maintaining the positional accuracy of an integrator optical system even when subjected to an external force.

Means for Solving the Problems

For the solution of the above-mentioned problems, one of desirable aspects of the present invention is as follows. The projection image display apparatus includes an integrator optical system which converges and uniformizes a light emitted from a light source, a color separating optical system which separates the colors of the light emitted from the integrator optical system, a color synthesizing optical system which synthesizes lights separated by the color separating optical system, a projection optical system which emits the light, which has been synthesized by the color synthesizing optical system, onto a projection surface, a first optical case which fixes and houses the integrator optical system, the color separating optical system, and the color synthesizing optical system at respective predetermined positions, and a second optical case which fixes and houses optical components of the integrator optical system at predetermined positions, and the second optical case is attached to the first optical case.

Effects of the Invention

According to the present invention, it is possible to provide a projection image display apparatus capable of maintaining the positional accuracy of an integrator optical system even when subjected to an external force.

BRIEF DESCRIPTIONS OF THE DRAWINGS

BEST MODE FOR CARRYING OUT THE INVENTION

An embodiment will be described below with reference to the drawings.

Figure 1:
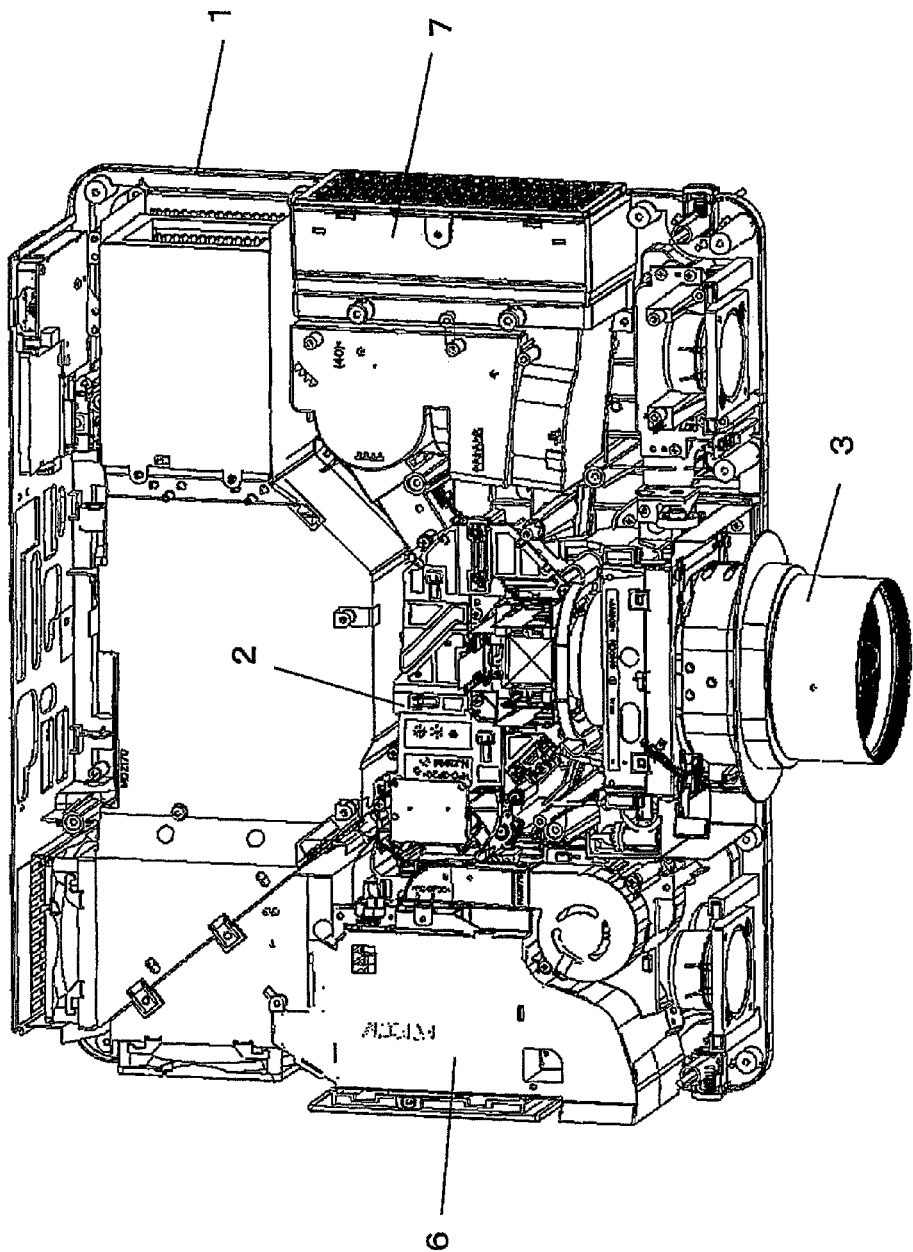
FIG. 1 is a diagram showing an overall configuration of a projection image display apparatus according to the present embodiment.

FIG. 1 is a diagram showing an overall configuration of a projection image display apparatus according to the present embodiment. More specifically, an internal configuration of the display apparatus is shown by removing an upper cover of a housing. The housing 1 houses an optical engine 2 in which light is emitted from a light source and a liquid crystal panel serving as a display element is irradiated with the light to form an image and a projection optical system 3 which enlarges and projects the image formed on the liquid crystal panel through a projection lens. In addition, a power supply unit 6, a cooling unit 7, an image signal circuit (not shown) and a control circuit (not shown) are housed in the housing 1.

Figure 2:
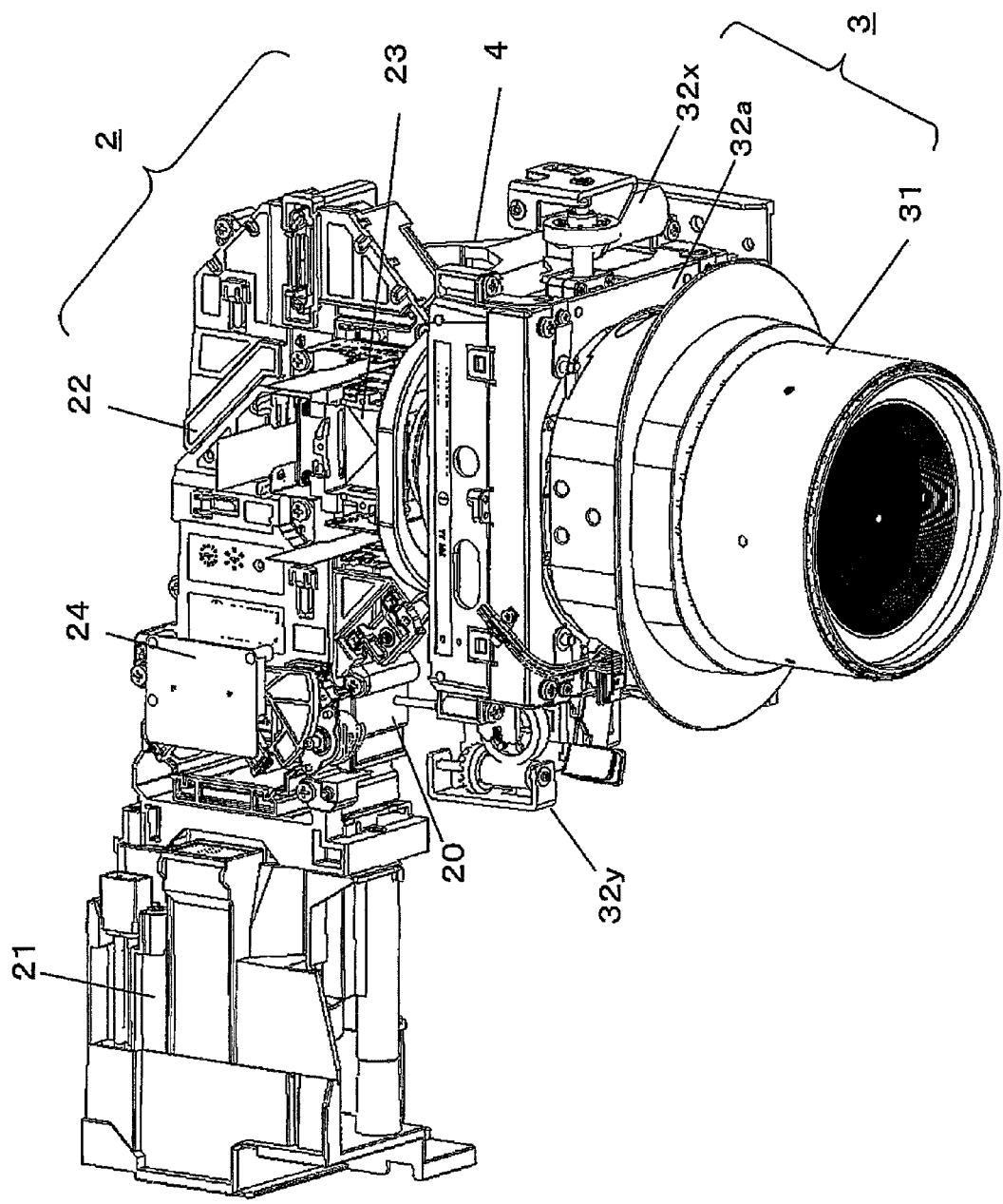
FIG. 2 is a diagram showing a state where an optical engine and a projection optical system are taken out of a housing.

FIG. 2 is a diagram showing a state where the optical engine 2 and the projection optical system 3 are taken out of the housing 1. The optical engine 2 and the projection optical system 3 are mounted on and fixed to a common base 4. Note that the projection optical system 3 may be mounted on and fixed to the optical engine 2.

The optical engine 2 is composed of a light source unit 21, a color separating optical system 22, a color synthesizing optical system 23, and an iris unit 24. These components are housed in a cylindrical light guide 20 (first optical case) and are respectively fixed to predetermined positions. The light source unit 21 is a light source such as an ultra-high pressure mercury lamp and emits substantially white light. The color separating optical system 22 separates the substantially white light into lights of the three primary colors of R, G and B and guides each of the lights of the three primary colors to each corresponding liquid crystal panel. The color synthesizing optical system 23 has liquid crystal panels for R, G and B and a cross dichroic prism, and forms respective images based on RGB signals and performs color synthesis of these images.

The projection optical system 3 is composed of a projection lens 31 and a lens shift mechanism 32. Image light emitted from the color synthesizing optical system 23 is enlarged by the projection lens 31 and is projected onto a screen or the like. The lens shift mechanism 32 holds the projection lens 31 and moves the projection lens 31 in two axial directions perpendicular to an optical axis (projection direction), and includes a horizontal-direction (X-direction) driving unit 32x and a vertical-direction (Y-direction) driving unit 32y. The projection lens 31 is fixed to a lens attachment surface 32a of the lens shift mechanism 32. Thus, a position of an image to be projected onto the screen can be adjusted by moving it in a horizontal direction and a vertical direction. Note that the projection lens may be directly fixed to the optical engine without providing the lens shift mechanism in the projection optical system.

Figure 3:
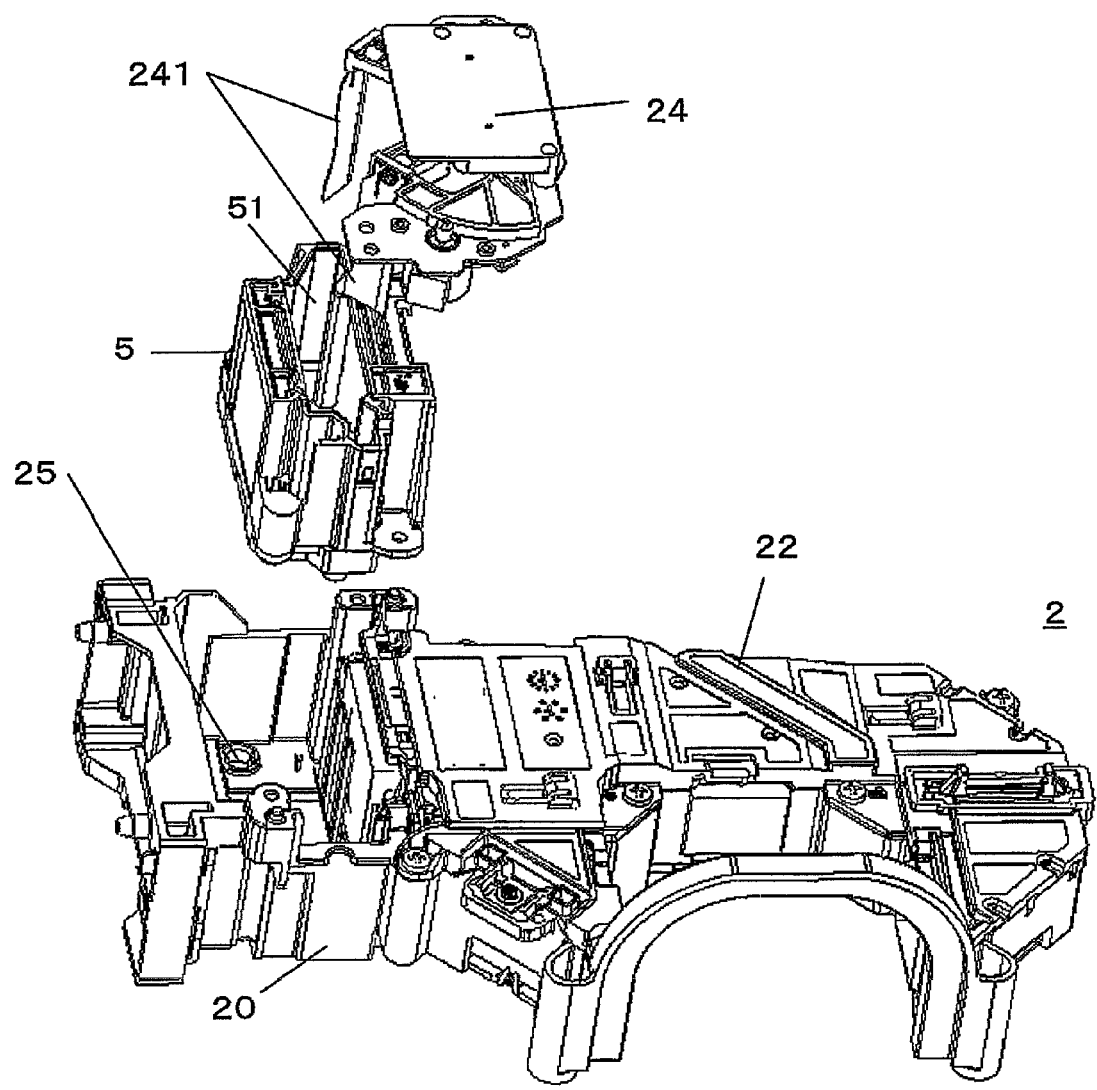
FIG. 3 is a diagram showing a configuration of a light guide and an integrator optical case.

FIG. 3 is a diagram showing a configuration of the light guide 20 and an integrator optical unit 5. The integrator optical unit 5 is mounted on and fixed to the light guide 20, with optical components of an integrator optical system being fixed thereto. The function of the integrator optical system is to uniformize non-uniform brightness within an illumination range of light emitted from the light source unit 21 and illuminate a rectangular range larger than an opening of a rectangular liquid crystal panel.

The iris unit 24 is inserted from an insertion hole 51 of the integrator optical unit 5 so that wings 241 are inserted between a first integrator lens and a second integrator lens, and is thus fixed to the optical engine 2. The wings 241 are opened and closed to adjust the amount of light emitted from the light source unit 21. This enables contrast adjustment.

Figure 4:
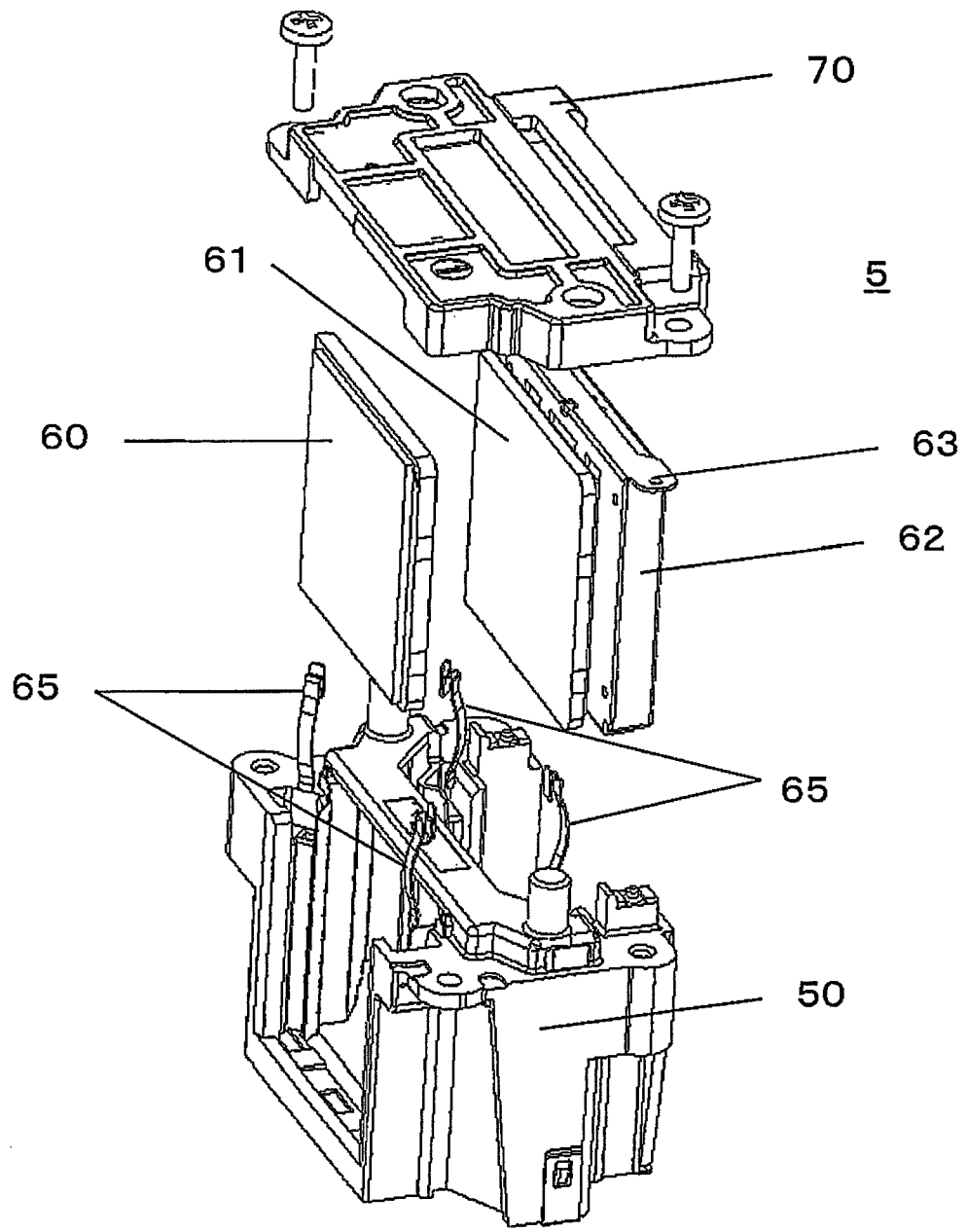
FIG. 4 is a diagram showing a configuration of an integrator optical case and optical components fixed thereto.

FIG. 4 is a diagram showing a configuration of an integrator optical case 50 (second optical case) and optical components fixed thereto.

A first integrator lens 60 and a second integrator lens 61 are respectively inserted into grooves (shown in FIG. 5) of the integrator optical case 50. Positioning surfaces in a right-angle direction and in a vertical direction with respect to an optical axis are formed in the grooves. By inserting each of the integrator lenses via spring members 65 (two spring members 65 for each integrator lens in the example shown in FIG. 4), the integrator lenses are pressed and fixed to the positioning surfaces in the right-angle direction and in the vertical direction with respect to the optical axis. A polarizing beam splitter (hereinafter, referred to as PBS) 62 is disposed substantially parallel to the integrator lenses. The PBS may be omitted.

Figure 5:
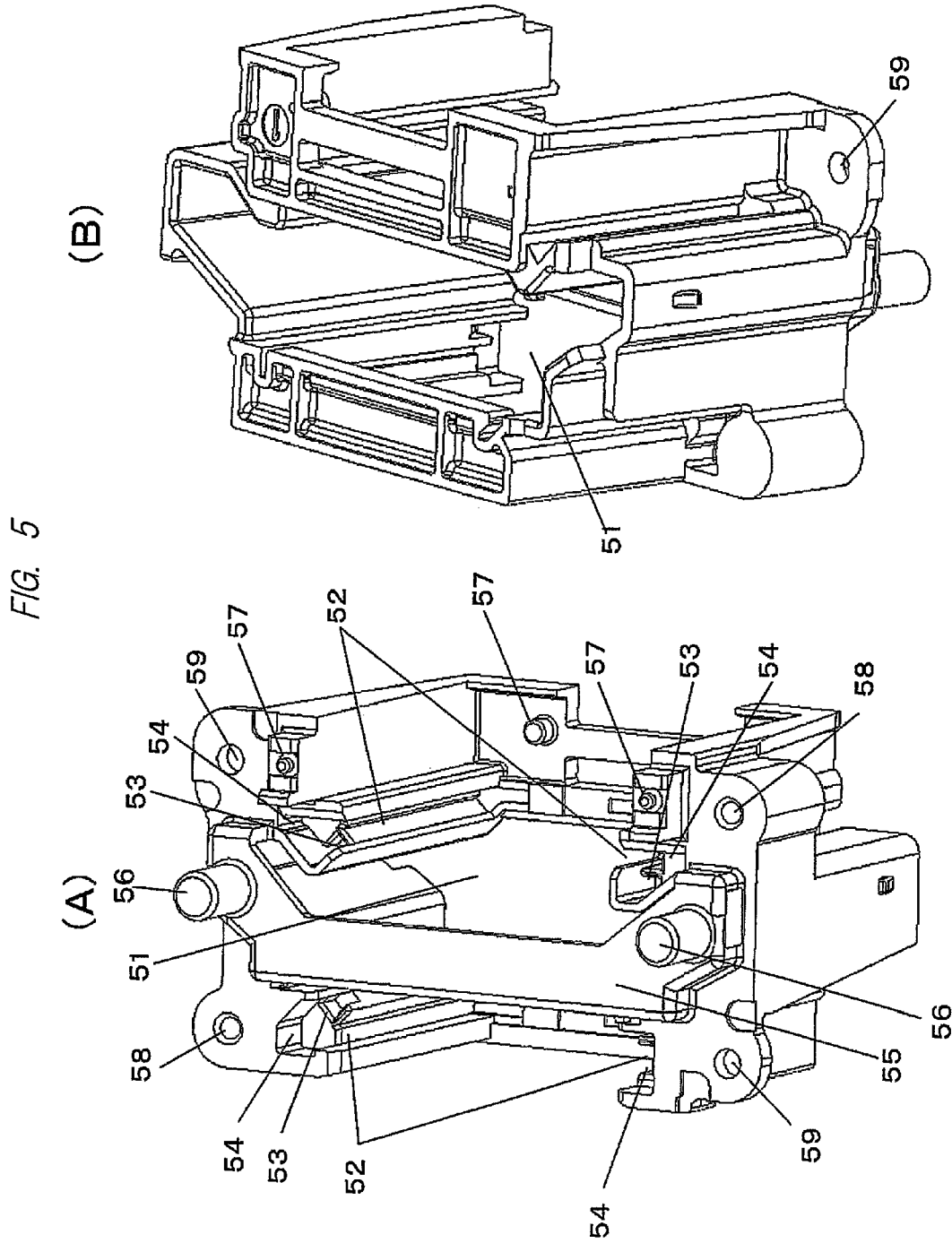
FIG. 5 is a perspective view showing a shape of an integrator optical case.

FIG. 5 is a perspective view showing a shape of the integrator optical case 50. FIG. 5(A) is a diagram showing the integrator optical case 50 viewed from an upper surface thereof and FIG. 5(B) is a diagram showing the integrator optical case 50 viewed from a bottom surface thereof.

The integrator optical case 50 has two grooves 52 into which the first integrator lens 60 and the second integrator lens 61 are inserted. Insertion holes 53 of the spring members 65 for positioning and holding the integrator lenses and adhesive material filling holes 54 are provided at both ends of the respective grooves. The adhesive material filling holes 54 for the adhesion of the integrator optical case 50 and the integrator lenses with an adhesive material or the like are provided in order to increase the reliability of the holding after the integrator lenses are fixed, but the adhesion with an adhesive material or the like is not always necessary.

A reinforcement rib 55 is passed between the two integrator lens insertion grooves. Thus, rigidity of the integrator optical case 50 is increased to be a member which is less likely to be deformed. Also, the reinforcement rib 55 has positioning pins 56 for the fixation to the light guide 20, and the positioning pins 56 are respectively fitted in positioning holes 25 of the light guide, so that highly accurate positioning can be achieved.

The integrator optical case 50 is inserted into the light guide 20 in a direction opposite to the insertion direction of the integrator lens after the optical components of the integrator optical system are inserted into the integrator optical case 50. More specifically, the upper surface of the integrator optical case 50 is positioned so as to be directed downward in FIG. 3 and the bottom surface of the integrator optical case 50 is positioned so as to be directed upward in FIG. 3.

The reason why the upper surface of the integrator optical case 50 is positioned at a lower part of the light guide 20 is to make it easy to arrange the iris unit 24 between the first integrator lens 60 and the second integrator lens 61. More specifically, an iris unit insertion hole 51 is provided on the bottom surface of the integrator optical case 50, and the iris unit 24 is inserted from the insertion hole 51. In this manner, it is possible to avoid the case where the iris unit 24 cannot be attached due to the obstruction of the reinforcement rib described below.

PBS positioning pins 57 (four pins in the example shown in FIG. 5) are arranged in the integrator optical case 50, and are respectively fitted in positioning holes 63 of a PBS holder, so that highly accurate positioning can be achieved. Further, the integrator optical case 50 has screw holes 58 (two holes in the example shown in FIG. 5) for attaching an integrator optical upper case 70, and the rigidity of the integrator optical case 50 can be strengthened by fixing the integrator optical upper case 70 with screws. Also, the integrator optical case 50 has screw holes 59 (two holes in the example shown in FIG. 5) for the attachment to the light guide 20.

In the configuration according to the present embodiment, the first integrator lens 60, the second integrator lens 61, and the PBS 62 are integrally fixed to the integrator optical case 50, and only the integrator optical case 50 is attached to the light guide 20. More specifically, since the first integrator lens 60, the second integrator lens 61, and the PBS 62 are not directly fixed to the light guide 20, even when the light guide 20 is deformed by an external force, the deformation is blocked by the integrator optical case 50 having high rigidity, and the respective optical components housed therein are held at predetermined positions with predetermined accuracy. Therefore, the positional accuracy of the respective optical components is maintained even when subjected to an external force or the like, and deterioration in quality of an image to be displayed (occurrence of raster distortion and luminance decrease) can be prevented.

DESCRIPTION OF REFERENCE SIGNS

1 . . . housing, 2 . . . optical engine, 3 . . . projection optical system, 4 . . . common base, 5 . . . integrator optical unit, 20 . . . light guide, 21 . . . light source unit, 22 . . . color separating optical system, 23 . . . color synthesizing optical system, 24 . . . iris unit, 241 . . . wing of iris unit, 25 . . . positioning hole of light guide, 31 . . . projection lens, 32 . . . lens shift mechanism, 50 . . . integrator optical case, 51 . . . iris unit insertion hole, 52 . . . integrator lens insertion groove, 53 . . . insertion hole of spring member, 55 . . . reinforcement rib, 56 . . . integrator optical unit positioning pin, 57 . . . PBS positioning pin, 58 and 59 . . . screw hole, 60 . . . first integrator lens, 61 . . . second integrator lens, 62 . . . PBS, 65 . . . spring member, 70 . . . integrator optical upper case

The invention claimed is:

1. A projection image display apparatus comprising:
an integrator optical system which converges and uniformizes light from a light source;
a color separating optical system which separates colors of light emitted from the integrator optical system;
a color synthesizing optical system which synthesizes lights separated by the color separating optical system;
a projection optical system which emits the light, which has been synthesized by the color synthesizing optical system, onto a projection surface;
a first optical case which fixes and houses the integrator optical system, the color separating optical system, and the color synthesizing optical system at respective predetermined positions; and
a second optical case which fixes and houses optical components of the integrator optical system at predetermined positions,
wherein the second optical case is attached to the first optical case,
wherein the second optical case is inserted and attached to the first optical case in a direction opposite to an insertion direction of the optical components of the integrator optical system, and
wherein the integrator optical system further includes an iris unit which adjusts the amount of the light from the light source, and the second optical case has an insertion hole for inserting the iris unit on its bottom surface.

2. The projection image display apparatus according to claim 1,
wherein the optical components of the integrator optical system include first and second integrator lenses, and
the first and second integrator lenses are inserted into the second optical case along surfaces vertical to an axis of the light from the light source, respectively.

3. The projection image display apparatus according to claim 2,
wherein a reinforcement rib is provided between the first and second integrator lenses.

* * * * *